US012458954B1

(12) United States Patent
Ibrahim et al.

(10) Patent No.: US 12,458,954 B1
(45) Date of Patent: Nov. 4, 2025

(54) Co3O4@C DERIVED FROM METAL-ORGANIC FRAMEWORKS USE FOR PRODUCTION OF METHYL ETHYL KETONE (MEK)

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Abd El-Aziz Ahmed Said, Assiut (EG)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/042,834

(22) Filed: Jan. 31, 2025

(51) Int. Cl.
| | |
|---|---|
| C07C 45/00 | (2006.01) |
| B01J 21/18 | (2006.01) |
| B01J 23/75 | (2006.01) |
| B01J 35/45 | (2024.01) |
| B01J 35/50 | (2024.01) |
| B01J 37/08 | (2006.01) |

(52) U.S. Cl.
CPC ............... *B01J 23/75* (2013.01); *B01J 21/18* (2013.01); *B01J 35/45* (2024.01); *B01J 35/505* (2024.01); *B01J 37/086* (2013.01); *C07C 45/002* (2013.01)

(58) Field of Classification Search
USPC ........................................................ 568/403
See application file for complete search history.

(56) References Cited

U.S. PATENT DOCUMENTS

| | | | |
|---|---|---|---|
| 4,049,571 | A | 9/1977 | Nissen et al. |
| 2016/0145227 | A1 | 5/2016 | Dugar et al. |

FOREIGN PATENT DOCUMENTS

| | | |
|---|---|---|
| CN | 105056958 A | 11/2015 |
| CN | 109065897 A | 12/2018 |

OTHER PUBLICATIONS

Geravand, et al., Korean J. Chem. Eng, 32, 2418-2428, 2015.*
Peng Chen, et al, "A novel and efficient route for aryl ketones generation over Co3O4/Ag@C3N4 photocatalyst", Chemical Engineering Science, vol. 207, Nov. 2, 2019, pp. 271-279 (9 pages).
Bedraj Pandey, et al., "Selective ketone formations via cobalt-catalyzed β-alkylation of secondary alcohols with primary alcohols", Organic Letters, vol. 21, Issue 18, Sep. 3, 2019, pp. 7420-7423 (4 pages).
Syoji Tan, et al., "Catalytic oxidation of olefin over oxide catalysts containing molybdenum: III. Oxidation of olefin to ketone over Co3O4 MoO3 and SnO2 MoO3 catalysts", Journal of Catalysis, vol. 17, Issue 2, May 1970, pp. 132-142 (4 pages).

\* cited by examiner

*Primary Examiner* — Ana Z Muresan
(74) *Attorney, Agent, or Firm* — Oblon, McClelland, Maier & Neustadt, L.L.P.

(57) ABSTRACT

A method of methyl ether ketone (MEK) production from 2-butanol includes contacting 2-butanol in the gas phase with a solid Co₃O₄@C nanocomposite catalyst to dehydrogenate the 2-butanol and form the MEK and hydrogen while gas sparging the reactor, where the Co₃O₄@C nanocomposite catalyst has a conversion of greater than or equal to 70 mol. % for 2-butanol to MEK and a selectivity of greater than or equal to 97.0% for 2-butanol to MEK.

20 Claims, 11 Drawing Sheets

Co3O4@C DERIVED FROM METAL-ORGANIC FRAMEWORKS USE FOR PRODUCTION OF METHYL ETHYL KETONE (MEK)

BACKGROUND

Technical Field

The present disclosure is directed to $Co_3O_4$@C derived from metal-organic frameworks, more particularly, to $Co_3O_4$@C derived from metal-organic frameworks for green generation of methyl ethyl ketone (MEK) as a biofuel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Nowadays, approximately 80% of the initial energy supply and 66% of the power generated today comes from natural fossil fuels, including coal, oil, and gas. It is commonly recognized that burning fossil fuels releases more carbon dioxide, nitrogen oxides, sulfur oxides, and particulate matter into the atmosphere, which leads to a variety of environmental pollution issues. Thus, to support sustainable growth, clean energy development is needed. Accordingly, societies must quickly transition to clean, renewable energy sources primarily due to the depletion of non-renewable energy supplies and environmental concerns. Despite the low cost of solar energy generation, people must rely on costly, easily disposable batteries for energy storage, which implies that batteries must be changed often. Due to its high octane number and non-toxicity, methyl ethyl ketone (MEK) has recently been identified as a promising next-generation biofuel option for usage in spark-ignition engines. MEK is a solvent used in the dewaxing of lubricating oil, printing inks, and adhesives. It has technical, commercial, and medical uses, and its use in the medical field has increased during COVID-19 (the 2019 Corona Virus Disease caused by SARS-CoV-2). Medical instrument sterilization and vegetable oil extraction are some of the more uses for MEK.

The demand for MEK has grown at a rate of 6.5% annually and is now growing at a similar pace. By 2020, MEK output around the world had surpassed 1.7 million tons. By 2024, it is anticipated that the MEK market would have grown from its estimated 2.6 billion USD valuation in 2015 to 4.0 billion USD. Paint, lacquers, and printing inks account for 40% of MEK's revenues, followed by the chemical sector at 18% and miscellaneous at 42%. MEK can be produced via several different methods, including (1) vapor phase dehydrogenation of 2-butanol, (2) liquid phase n-butane oxidation, (3) direct n-butane oxidation (Hoechst-Wacker process), and (4) direct n-butane oxidation (Maruzen process). Nowadays, most MEK (88%) is made commercially via the exothermic dehydrogenation of 2-butanol. In addition, this process is controllable and non-corrosive and controllable. Little work was observed in the literature related to this process, including Cu/MgO and Cu/SiO₂ [See: Keuler, J., et al., The dehydrogenation of 2-butanol over copper-based catalysts: optimising catalyst composition and determining kinetic parameters, *Applied Catalysis A: General*, Volume 218, Issues 1-2, 2001, pages 171-180] membrane reactor containing Pd—Ag [See: Keuler, J., et al., The dehydrogenation of 2-butanol in a Pd—Ag membrane reactor, *Journal of Membrane Science*, Volume 202, Issues 1-2, 2002, pages 17-26], $Cu/SiO_2$ cogelled xerogel [See: Lambert, S., et al., On the structure-sensitivity of 2-butanol dehydrogenation over $Cu/SiO_2$ cogelled xerogel catalysts, Catalysis Communications, Volume 8, Issue 12, 2007, pages 2032-2036], $Cu/ZnO/Al_2O_3$ and $Cu/SiO_2$ [See: Geravand, E., et al., Copper-based nanocatalysts for 2-butanol dehydrogenation: Screening and optimization of preparation parameters by response surface methodology, *Korean J. Chem. Eng*, 32, 2418-2428, 2015], NiO doped with F and $K_2O$ [See: Halawy, S. et al., Boosting NiO Catalytic Activity by x wt % F-ions and $K_2O$ for the Production of Methyl Ethyl Ketone (MEK) via Catalytic Dehydrogenation of 2-Butanol, *ChemCatChem,* 2021, 13, 2200].

Although, a few catalysts have been used in the past for production of MEK from 2-butanol using various catalysts, many existing catalysts may not achieve a balance between high conversion rates and high selectivity, often leading to undesired side reactions or incomplete conversion. Also, catalysts with limited lifespans, high costs, or the need for extreme reaction conditions (temperature/pressure) make the process less sustainable. Accordingly, it is an object of the present disclosure to address the shortcomings of the conventional methods by providing a method for enhancing the production of MEK from 2-butanol, using a catalyst, with high conversion efficiency, exceptional selectivity, and enhanced stability.

SUMMARY

In an exemplary embodiment, a method of methyl ether ketone (MEK) production from 2-butanol is described. The method includes contacting 2-butanol in the gas phase with a solid $Co_3O_4$@C nanocomposite catalyst to dehydrogenate the 2-butanol and form the MEK and hydrogen while gas sparging the reactor, where the $Co_3O_4$@C nanocomposite catalyst has a conversion of greater than or equal to 70 mol. % for 2-butanol to MEK and a selectivity of greater than or equal to 97.0% for 2-butanol to MEK.

In some embodiments, the $Co_3O_4$@C nanocomposite catalyst has a conversion of greater than or equal to 95 mol. % for 2-butanol to MEK and a selectivity of greater than or equal to 97.5% for 2-butanol to MEK at a reaction temperature of 300° C.

In some embodiments, the $Co_3O_4$@C nanocomposite catalyst has a conversion of greater than or equal to 99 mol. % for 2-butanol to MEK and a selectivity of greater than or equal to 97.75% for 2-butanol to MEK at a reaction temperature of 300° C.

In some embodiments, the $Co_3O_4$@C nanocomposite catalyst has a conversion of greater than or equal to 99.99 mol. % for 2-butanol to MEK and a selectivity of greater than or equal to 98% for 2-butanol to MEK at a reaction temperature of 300° C.

In some embodiments, the $Co_3O_4$@C nanocomposite catalyst has a conversion of greater than or equal to 75 mol. % for 2-butanol to MEK and a selectivity of greater than or equal to 98% for 2-butanol to MEK at a reaction temperature of 250° C.

In some embodiments, the $Co_3O_4$@C nanocomposite catalyst has a conversion of greater than or equal to 76 mol. % for 2-butanol to MEK and a selectivity of greater than or equal to 99% for 2-butanol to MEK at a reaction temperature of 250° C.

In some embodiments, the $Co_3O_4$@C nanocomposite catalyst has a conversion of greater than or equal to 80 mol. % for 2-butanol to MEK and a selectivity of greater than or equal to 97.5% for 2-butanol to MEK at a reaction temperature of 275° C.

In some embodiments, the $Co_3O_4$@C nanocomposite catalyst has a conversion of greater than or equal to 90 mol. % for 2-butanol to MEK and a selectivity of greater than or equal to 98% for 2-butanol to MEK at a reaction temperature of 275° C.

In some embodiments, the $Co_3O_4$@C nanocomposite catalyst is in the form of $Co_3O_4$ nanoparticles with an average particle size in a range from 1 to 100 nm dispersed in a carbon matrix.

In some embodiments, the $Co_3O_4$@C nanocomposite catalyst is in the form of $Co_3O_4$ nanoparticles with an average particle size in a range from 5 to 60 nm dispersed in a carbon matrix.

In some embodiments, the $Co_3O_4$@C nanocomposite catalyst is in the form of $Co_3O_4$ nanoparticles with an average particle size in a range from 15 to 50 nm dispersed in a carbon matrix.

In some embodiments, the $Co_3O_4$@C nanocomposite catalyst is in the form of $Co_3O_4$ nanoparticles with an average particle size in a range from 20 to 40 nm dispersed in a carbon matrix.

In some embodiments, the $Co_3O_4$@C nanocomposite catalyst is formed from the calcination of ZIF-67 metal-organic framework at a temperature from 350 to 750° C.

In some embodiments, the $Co_3O_4$@C nanocomposite catalyst is formed from the calcination of ZIF-67 metal-organic framework at a temperature from 375 to 600° C.

In some embodiments, the $Co_3O_4$@C nanocomposite catalyst is formed from the calcination of ZIF-67 metal-organic framework at a temperature from 390 to 500° C.

In some embodiments, the $Co_3O_4$@C nanocomposite catalyst is formed from the calcination of ZIF-67 metal-organic framework at a temperature from 390 to 410° C.

In some embodiments, the gas hourly shape volume (GHSV) is in a range from 50 to 70 $ml·h^{-1}·g^{-1}$ and wherein the $Co_3O_4$@C nanocomposite catalyst has a conversion of greater than or equal to 99.99 mol. % for 2-butanol to MEK.

In some embodiments, the gas hourly shape volume (GHSV) is in a range from 110 to 150 $ml·h^{-1}·g^{-1}$ and wherein the $Co_3O_4$@C nanocomposite catalyst has a conversion of greater than or equal to 97.5 mol. % for 2-butanol to MEK.

In some embodiments, the gas hourly shape volume (GHSV) is in a range from 160 to 180 $ml·h^{-1}·g^{-1}$ and wherein the $Co_3O_4$@C nanocomposite catalyst has a conversion of greater than or equal to 95 mol. % for 2-butanol to MEK.

In some embodiments, the gas hourly shape volume (GHSV) is in a range from 180 to 200 $ml·h^{-1}·g^{-1}$ and wherein the $Co_3O_4$@C nanocomposite catalyst has a conversion of greater than or equal to 88 mol. % for 2-butanol to MEK.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
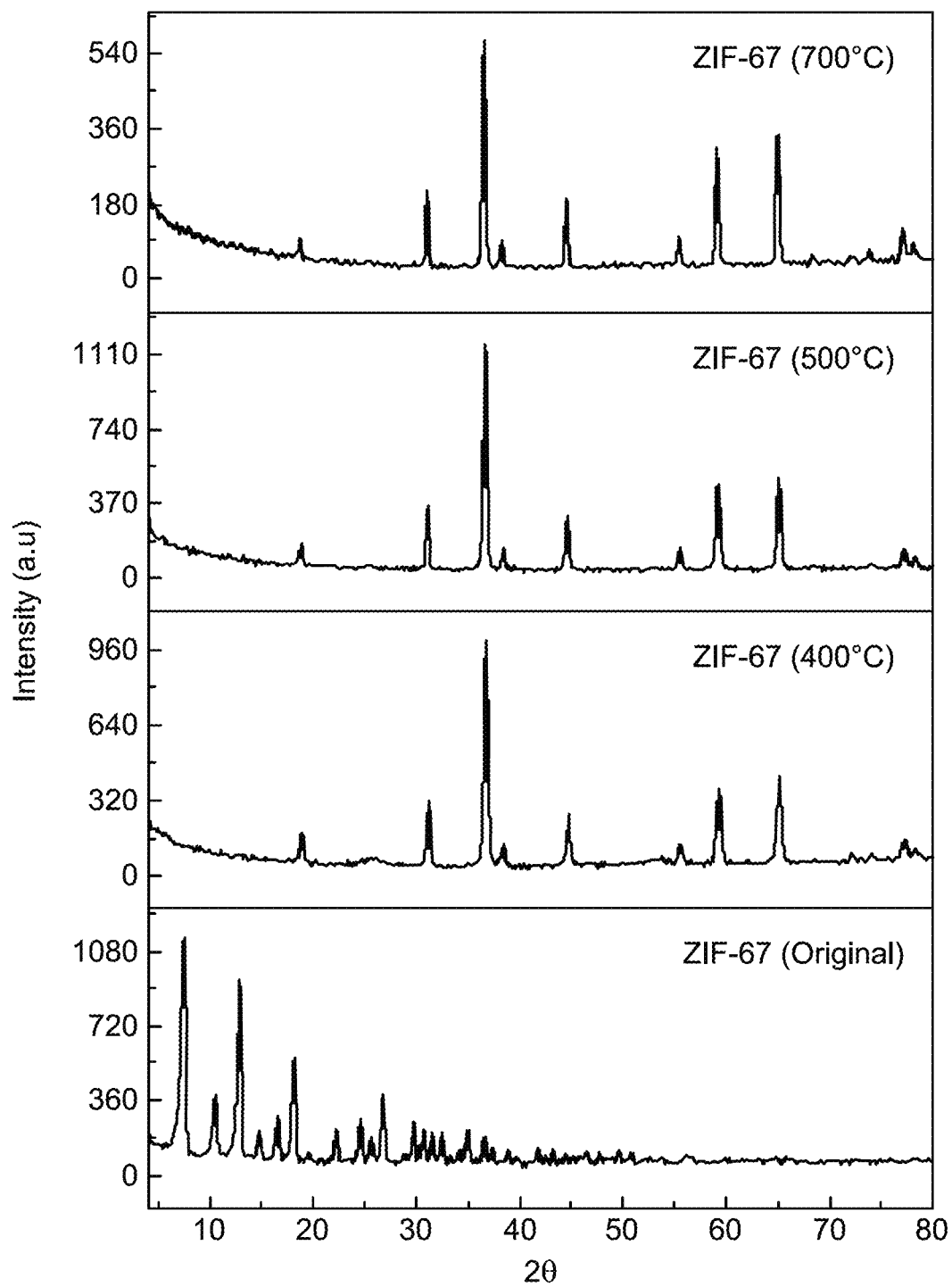
FIG. 1 is a X-ray diffractogram (XRD) of original and calcinated ZIF-67 metal-organic framework (MOF) at 400-700° C., according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'catalyst' refers to the substance that speeds up a chemical reaction without being consumed in the process.

As used herein, the term 'dehydrogenate' refers to the process of removing hydrogen atoms from a molecule, often resulting in the formation of a double bond or a more oxidized compound.

As used herein, the term 'selectivity' refers to the ability of a process, catalyst, or reaction to preferentially produce a specific product or outcome over others. It measures how effectively a system favours the formation of a desired product while minimizing the formation of undesired byproducts.

As used herein, the term 'conversion' refers to the percentage of reactant that is transformed into the desired product during a chemical reaction. Herein, it is referred to in terms of molar percentage (mol. %), the percentage of moles which are converted to a product. It indicates the efficiency of the reaction in utilizing the starting material.

As used herein, the term 'gas hourly space velocity' (GHSV) refers to the flow rate of gas through a reactor relative to the reactor's volume. It is typically expressed in units of inverse time and indicates how many times the volume of gas passes through the reactor in one hour. A higher GHSV typically means faster processing, but it can also affect reaction efficiency and selectivity.

As used herein, the term 'carbon matrix' refers to a structure made primarily of carbon, often in the form of a network or framework, that supports or encapsulates other materials or components, such as nanoparticles or active agents. In the present disclosure, the carbon matrix provides mechanical stability, enhances conductivity, and can also influence the dispersion and accessibility of the active sites, thereby improving the catalyst's performance.

As used herein, the term 'zeolitic material' refers to a material having the crystalline structure or three-dimensional framework of, but not always the elemental composition of, a zeolite. Zeolites are porous silicate or aluminosilicate minerals that occur in nature. Elementary building units of zeolites are $SiO_4$ (and, if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm), preferably 0.2-5 nm, more preferably 0.2-2 nm. Water molecules may be present inside these channels, channel intersections, and/or cages. Zeolites that are devoid of aluminum may be referred to as "all-silica zeolites" or 'aluminum-free zeolites.' Some zeolites which are substantially free of, but not devoid of, aluminum is referred to as 'high-silica zeolites.' Sometimes, the term 'zeolite' is used to refer exclusively to aluminosilicate materials, excluding aluminum-free zeolites or all-silica zeolites.

The zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g., gonnardite, natrolite, mesolite, paranatrolite, scolecite, and tetranatrolite), edingtonite framework (e.g., edingtonite and kalborsite), thomsonite framework, analcime framework (e.g., analcime, leucite, pollucite, and wairakite), phillipsite framework (e.g., harmotome), gismondine framework (e.g., amicite, gismondine, garronite, and gobbinsite), chabazite framework (e.g., chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework.

As used herein, the term 'carbonization' refers to the process of converting organic material into carbon or carbon-rich products through the application of heat in the absence of oxygen (or with limited oxygen). This process involves the decomposition of the material, typically at high temperatures, causing it to lose volatile components (such as water, gases, and oils) and leave behind a solid carbonaceous residue.

An aspect of the present disclosure is directed toward fabrication of $Co_3O_4$@C nano catalysts via the carbonization of ZIF-67 at 400-700° C. The present disclosure describes the use of the $Co_3O_4$@C nano catalysts for selective dehydrogenation of 2-butanol preferably in the vapor phase to form methyl ethyl ketone (MEK), an eco-friendly biofuel, at relatively low temperatures and atmospheric pressure. Catalytic activity tests show that the $Co_3O_4$@C catalyst calcined at 400° C. exhibits 100% conversion and 98% MEK selectivity at 300° C., with butene as a byproduct.

A method of producing MEK from 2-butanol is described. The method includes contacting 2-butanol in the gas phase with a solid $Co_3O_4$@C nanocomposite catalyst to dehydrogenate the 2-butanol and form the MEK and hydrogen while gas sparging the reactor.

In an embodiment, the 2-butanol is vaporized, where it's converted from liquid to gas, by methods such as direct heating, vacuum evaporation, bubbling or sparging, flash vaporization, etc. In a preferred embodiment, 2-butanol is vaporized by sparging, where an inert gas (e.g., nitrogen or argon) is bubbled through the liquid 2-butanol to assist in vaporization. One of the factors that affect the production of MEK from 2-butanol is the 2-butanol purity, as impurities can negatively affect the reaction efficiency, catalyst performance, and product quality. In an embodiment, the purity of 2-butanol is in greater than 90%, preferably 91%, preferably 92%, preferably 93%, preferably 94%, preferably 95%, preferably 96%, preferably 97%, preferably 98%, preferably 99%, and more preferably greater than 99.5%.

2-butanol is treated with the $Co_3O_4$@C nanocomposite catalyst in a reactor. The reactor is at least one of a fixed-bed reactor, a trickle-bed reactor, a moving bed reactor, a rotating bed reactor, a fluidized bed reactor, and a slurry reactor. In an embodiment, the reactor is a fixed-bed reactor. The reactor contains and/or includes the solid $Co_3O_4$@C nanocomposite catalyst in a bed thereof.

In one or more embodiments, the $Co_3O_4$@C nanocomposite catalyst is in the form of $Co_3O_4$ nanoparticles with an average particle size in a range from 1 to 100 nm, preferably about 5 to 60 nm, preferably about 15 to 50 nm, preferably 20 to 40 nm dispersed in a carbon matrix. In one or more embodiments, the $Co_3O_4$ nanoparticles are spherical or ellipsoidal. In a preferred embodiment, the $Co_3O_4$@C includes spherical $Co_3O_4$ nanoparticles with an average size in a range between 20 and 40 nm dispersed in a carbon matrix.

In one embodiment, the $Co_3O_4$@C nanocomposite catalyst is formed from the calcination of ZIF-67 metal-organic framework at a temperature from 300 to 800° C., 350 to 750° C., preferably 375 to 600° C., preferably 390 to 500° C., preferably 390 to 410° C., preferably 400° C. The calcination is carried out by heating it to a high temperature under a restricted supply of ambient oxygen. This is performed to remove impurities or volatile substances and to incur thermal decomposition.

In an embodiment, 2-butanol is introduced into the reactor at a flow rate of 50-150 mL/min, preferably 55-145 mL/min, preferably 60-140 mL/min, preferably 65-135 mL/min, preferably 70-130 mL/min, preferably 75-125 mL/min, preferably 80-120 mL/min, preferably 85-115 mL/min, preferably 90-110 mL/min, preferably 95-105 mL/min, preferably 100 mL/min.

In one or more embodiments, the reaction is maintained at a temperature in a range from 200 to 400° C., 225 to 350° C., preferably 250 to 325° C. In a specific embodiment, the reaction is maintained at a temperature of 250° C. In a specific embodiment, the reaction is maintained at a temperature of 275° C. In a preferred embodiment, the reaction is maintained at a temperature of 300° C.

Contacting the $Co_3O_4$@C nanocomposite catalyst with 2-butanol results in formation of MEK and hydrogen, aided by the catalytic action of the catalyst. In an embodiment, the $Co_3O_4$@C nanocomposite catalyst has a conversion of greater than or equal to 70% for 2-butanol to MEK and a selectivity of greater than or equal to 97.0% for 2-butanol to MEK.

In some embodiments, the $Co_3O_4$@C nanocomposite catalyst has a conversion of greater than or equal to 80%, 90%, 95%, preferably 97%, preferably 98%, preferably 99%, more preferably about 99.99% for 2-butanol to MEK and a selectivity of greater than or equal to 80%, 90%, 97.5%, preferably 97.75%, preferably 98% for 2-butanol to MEK at a reaction temperature of 300° C. In one embodiment, the $Co_3O_4$@C nanocomposite catalyst has a conversion of greater than or equal to 95% for 2-butanol to MEK and a selectivity of greater than or equal to 97.5% for 2-butanol to MEK at a reaction temperature of 300° C. In another embodiment, the $Co_3O_4$@C nanocomposite catalyst has a conversion of greater than or equal to 99% for 2-butanol to MEK and a selectivity of greater than or equal to 97.75% for 2-butanol to MEK at a reaction temperature of 300° C. In yet another embodiment, the $Co_3O_4$@C nanocomposite catalyst has a conversion of greater than or equal to 99.99% for 2-butanol to MEK and a selectivity of greater than or equal to 98% for 2-butanol to MEK at a reaction temperature of 300° C.

In some embodiments, the $Co_3O_4$@C nanocomposite catalyst has a conversion of greater than or equal to 60%, 70%, 75%, preferably 76%, for 2-butanol to MEK and a selectivity of greater than or equal to 80%, 90%, 97%, preferably 97.5%, preferably 98%, preferably about 99% for 2-butanol to MEK at a reaction temperature of 250° C. In one embodiment, the $Co_3O_4$@C nanocomposite catalyst has a conversion of greater than or equal to 75% for 2-butanol to MEK and a selectivity of greater than or equal to 98% for 2-butanol to MEK at a reaction temperature of 250° C. In another embodiment, the $Co_3O_4$@C nanocomposite catalyst has a conversion of greater than or equal to 76% for 2-butanol to MEK and a selectivity of greater than or equal to 99% for 2-butanol to MEK at a reaction temperature of 250° C.

In some embodiments, the $Co_3O_4$@C nanocomposite catalyst has a conversion of greater than or equal to 60%, 70%, 80%, preferably 85%, preferably 90% for 2-butanol to MEK and a selectivity of greater than or equal to 80%, 90%, 97%, preferably 97.5%, preferably 98%, for 2-butanol to MEK at a reaction temperature of 275° C. In one another embodiment, the $Co_3O_4$@C nanocomposite catalyst has a conversion of greater than or equal to 80% for 2-butanol to MEK and a selectivity of greater than or equal to 97.5% for 2-butanol to MEK at a reaction temperature of 275° C. In another embodiment, the $Co_3O_4$@C nanocomposite catalyst has a conversion of greater than or equal to 90% for 2-butanol to MEK and a selectivity of greater than or equal to 98% for 2-butanol to MEK at a reaction temperature of 275° C.

GHSV is a parameter in catalytic processes, representing the ratio of the volumetric flow rate of gas (reactant) to the weight of the catalyst. In an embodiment, the GHSV is in a range from 110 to 150 ml·h$^{-1}$·g$^{-1}$ and the $Co_3O_4$@C nanocomposite catalyst has a conversion of greater than or equal to 90%, preferably 97.5% for 2-butanol to MEK. In another embodiment, the GHSV is in a range from 160 to 180 ml·h$^{-1}$·g$^{-1}$ and the $Co_3O_4$@C nanocomposite catalyst has a conversion of greater than or equal to 85%, preferably 95% for 2-butanol to MEK. In yet another embodiment, the GHSV is in a range from 180 to 200 ml·h$^{-1}$·g$^{-1}$ and the $Co_3O_4$@C nanocomposite catalyst has a conversion of greater than or equal to 80%, preferably 88% for 2-butanol to MEK. In one preferred embodiment, the GHSV is in a range from 50 to 70 milliliters per hour per gram (ml·h$^{-1}$·g$^{-1}$) and the $Co_3O_4$@C nanocomposite catalyst has a conversion of greater than or equal to 99.99% for 2-butanol to MEK. This indicates that the $Co_3O_4$@C catalyst demonstrates outstanding performance for the dehydrogenation of 2-butanol to MEK at a GHSV of 50-70 ml·h$^{-1}$·g$^{-1}$. This balance leads to near-complete conversion, high selectivity, and sustained catalyst activity.

EXAMPLES

The following examples demonstrate a method of methyl ether ketone (MEK) production from 2-butanol. The examples are provided solely for illustration and are not to be construed as limitations of the present disclosure, as many variations thereof are possible without departing from the spirit and scope of the present disclosure.

Example 1: Fabricating the $Co_3O_4$@C Nanocatalysts

ZIF-67 was prepared via the interaction of $Co^{2+}$ (from $CoCl_2·6H_2O$) and 2-methyl imidazole (Hmim) in the presence of NaOH at room temperature. The resulting precipitate was kept for stirring for about 30 min. The synthesized ZIF-67 was collected via centrifugation, washed with methanol and deionized water, dried at 80° C., and finally annealed at 400-700° C. X-ray diffractogram (XRD), X-ray photoelectron spectroscopy (XPS), and high-resolution transmission electron microscope (HRTEM) techniques were used to characterize the prepared and calcined products.

Figure 2A:
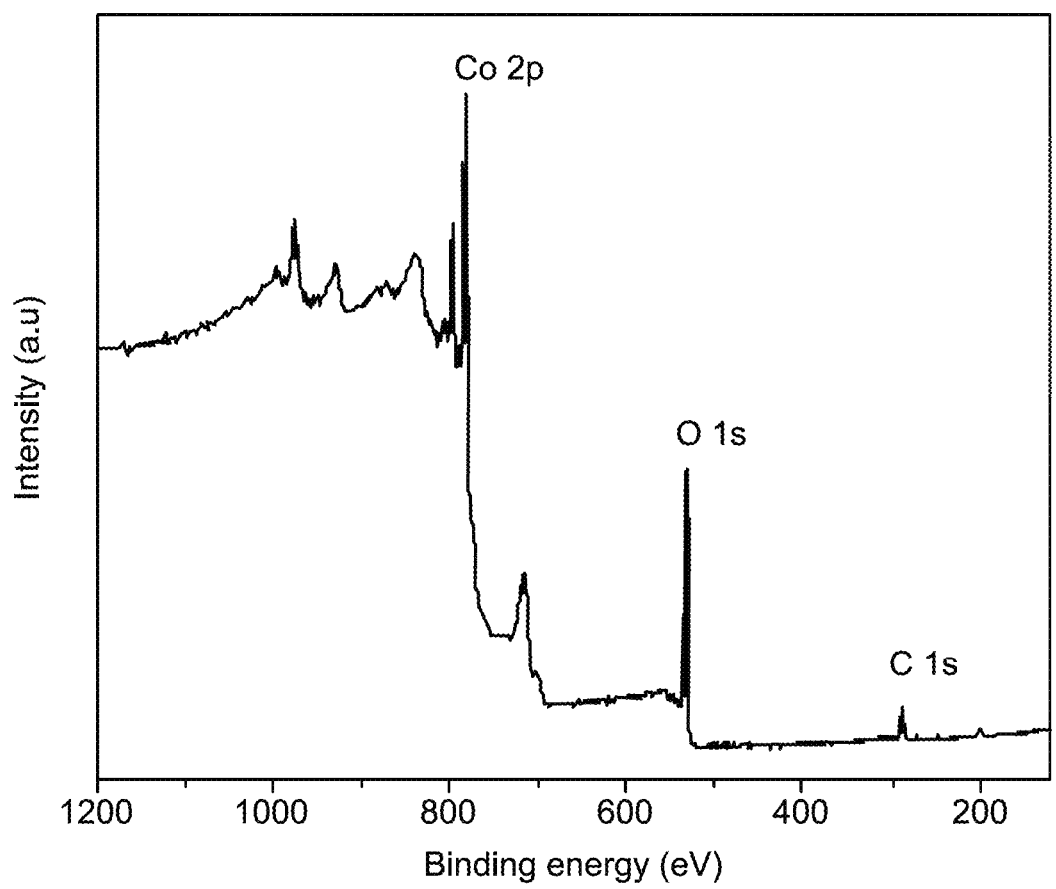
FIG. 2A shows an X-ray photoelectron spectroscopy (XPS) survey spectrum of ZIF-67 calcined at 400° C., according to certain embodiments.
Figure 2B:
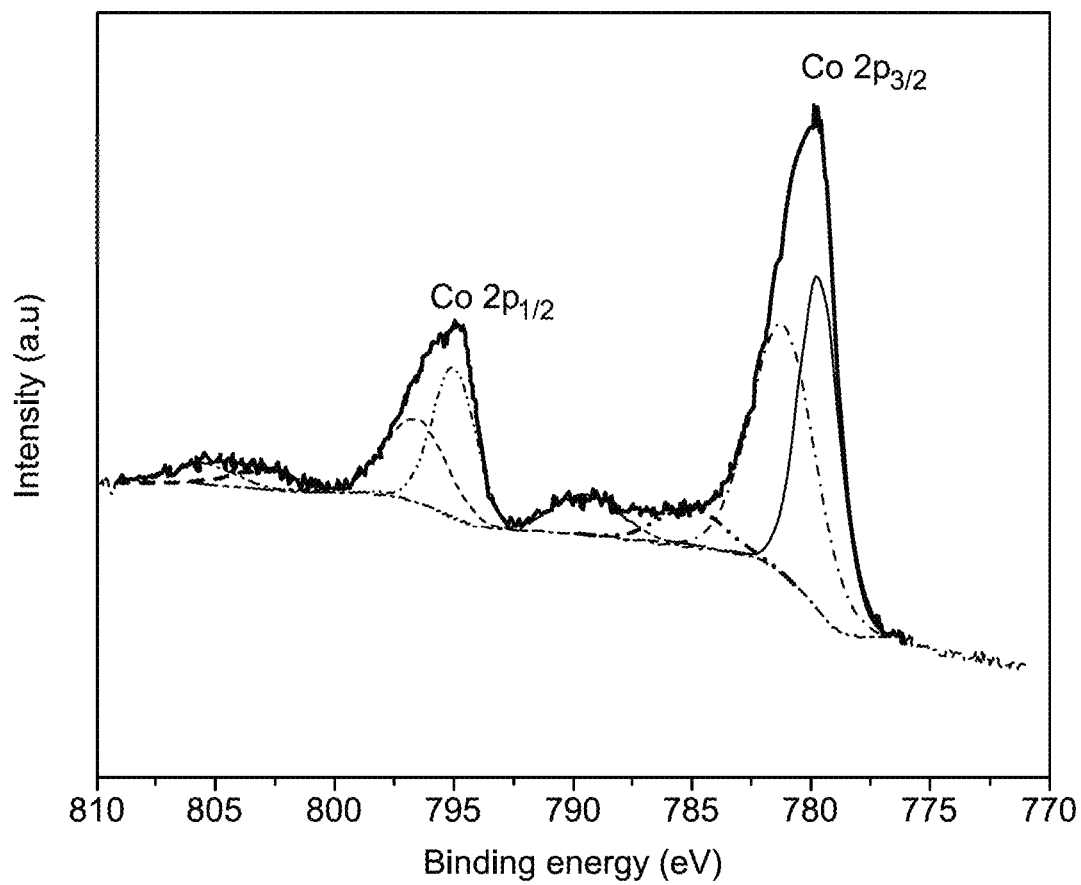
FIG. 2B shows an XPS graph for Co 2p of the ZIF-67 calcined at 400° C., according to certain embodiments.
Figure 2C:
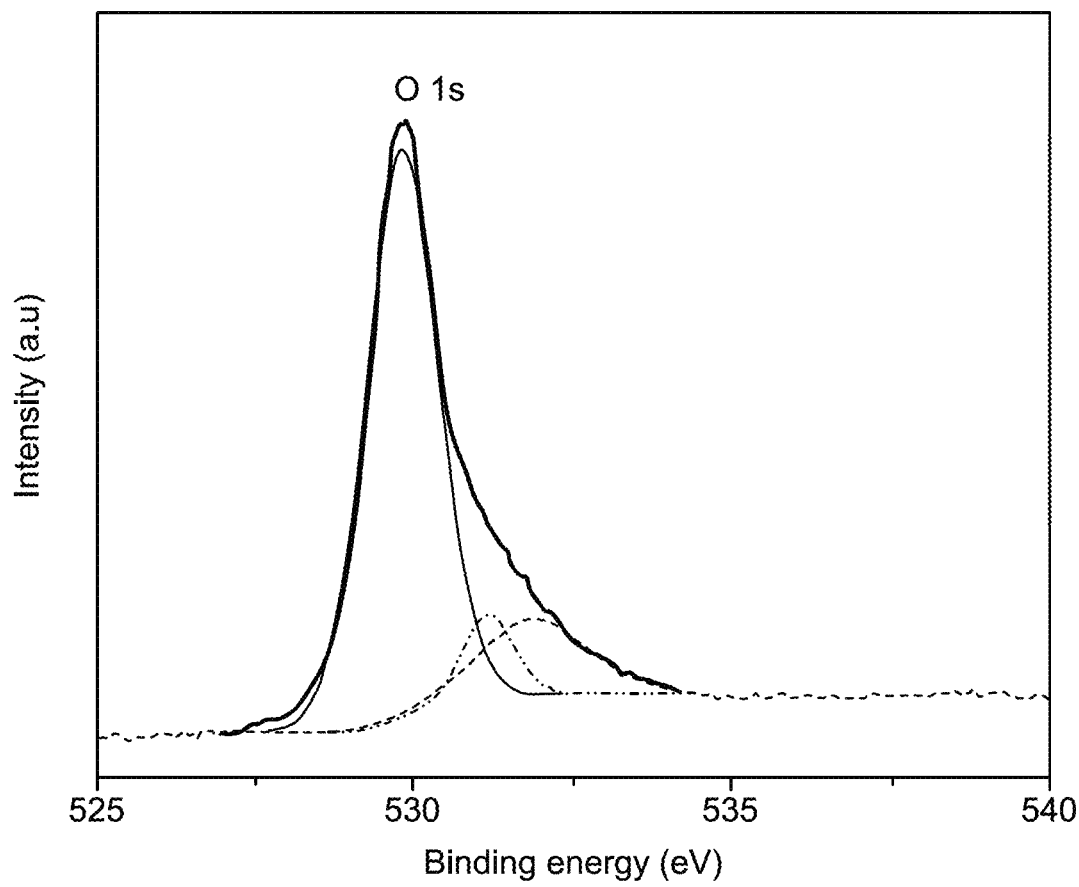
FIG. 2C shows an XPS graph for 0 is of the ZIF-67 calcined at 400° C., according to certain embodiments.
Figure 2D:
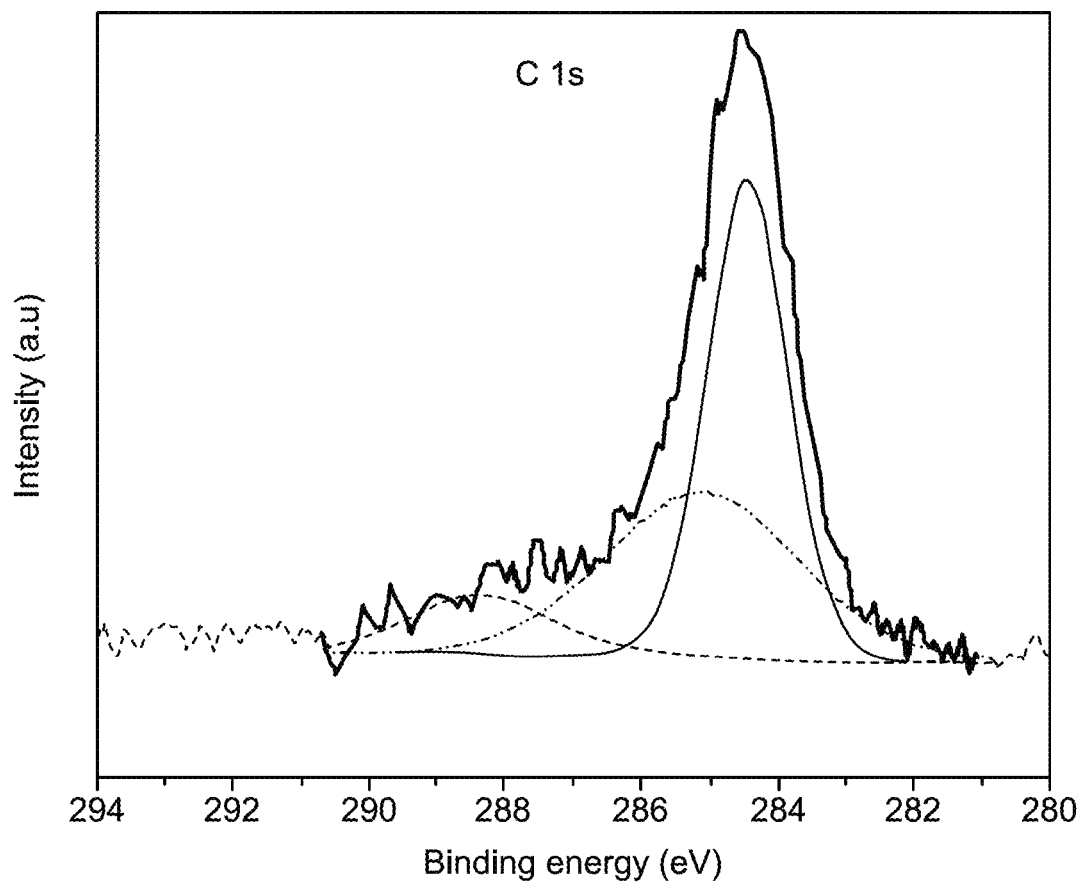
FIG. 2D shows an XPS graph for C is of the ZIF-67 calcined at 400° C., according to certain embodiments.
Figure 3:
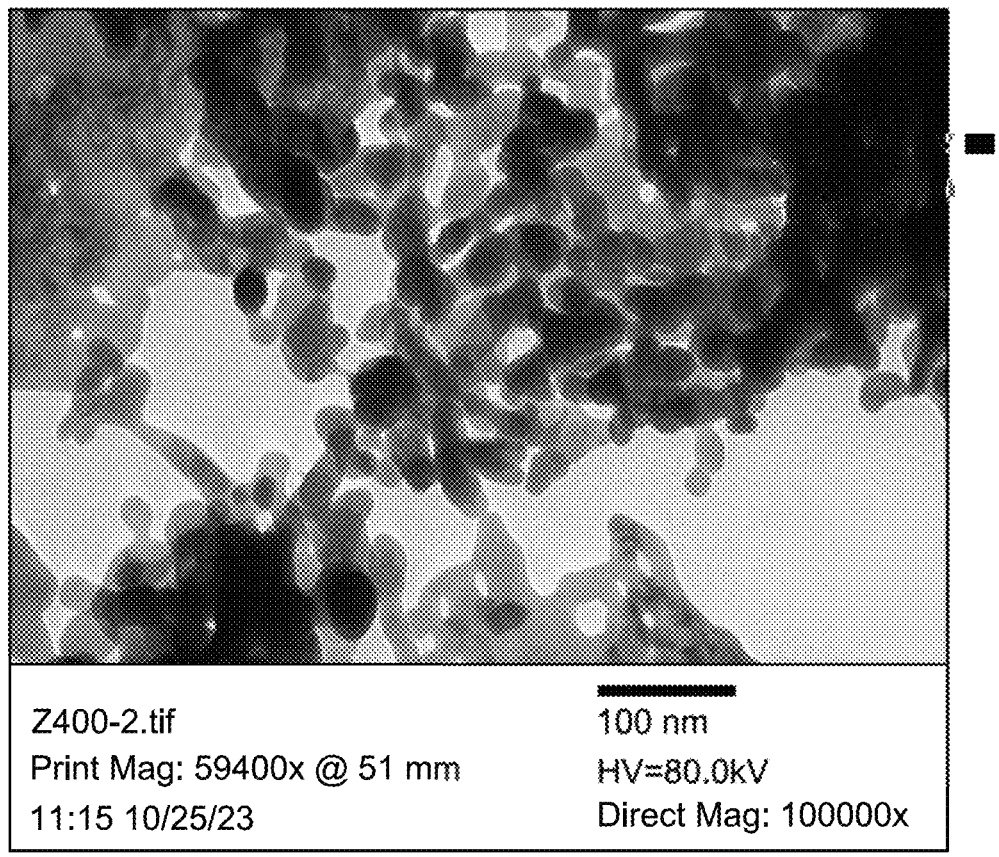
FIG. 3 illustrates a transmission electron microscope (TEM) image of ZIF-67 calcined at 400° C., according to certain embodiments.

XRD diffractograms of the original and calcined ZIF-67 metal-organic framework are shown in FIG. 1. The diffraction patterns of the original solid were well indexed to that identified in the standard CCDS card No. 671073 indicating the successful formation of ZIF-67 MOF. The diffraction lines of the calcinated ZIF-67 catalysts were well indexed to the cubic phase of $Co_3O_4$ (JCPDS No. 04-016-4508). The chemical bonding and the various oxidation states of the elements contained in $Co_3O_4$ produced from the carbonization of ZIF-67 at 400° C. were identified by XPS analysis, and the results are given in FIG. 2. The full survey of XPS spectra (FIG. 2A) confirmed the existence of Co, O and C species. High-resolution Co 2p XPS spectra of the composite are shown in FIG. 2B. The Co $2p_{1/2}$ and Co $2p_{3/2}$ spin-orbit signals of $CO_3O_4$ are represented by two peaks at 797.1 and 780.9 eV, respectively. The 0 is (FIG. 2C) XPS peak at 529.9 eV, which represents the lattice oxygen in the $CO_3O_4$ phase, provides additional evidence of the presence of $Co_3O_4$. The existence of surface adsorbed oxygen, such as $O_2^{2-}$ or $O^-$, which correspond to defect-oxide or hydroxyl-like groups, is indicated by the spectrum's tiny O is peak at 531.1 and 531.8 eV. The spectrum's C is (FIG. 2D) shows peaks at 284.4, 285.1 and 288.3 eV. These peaks were assigned to C—C, C=O, and O=C—O bonds. These peaks are due to the presence of carbon contained in the sample (from the combustion of ZIF-67) and from the adsorbed $CO_2$ on the catalyst surface. The TEM image of the ZIF-67 catalyst calcined at 400° C. is shown in FIG. 3. It illustrates that the catalyst particles are in nanoscale and coated with carbon shell. The results mentioned above confirmed the successful formation of $Co_3O_4$@C.

Figure 4:
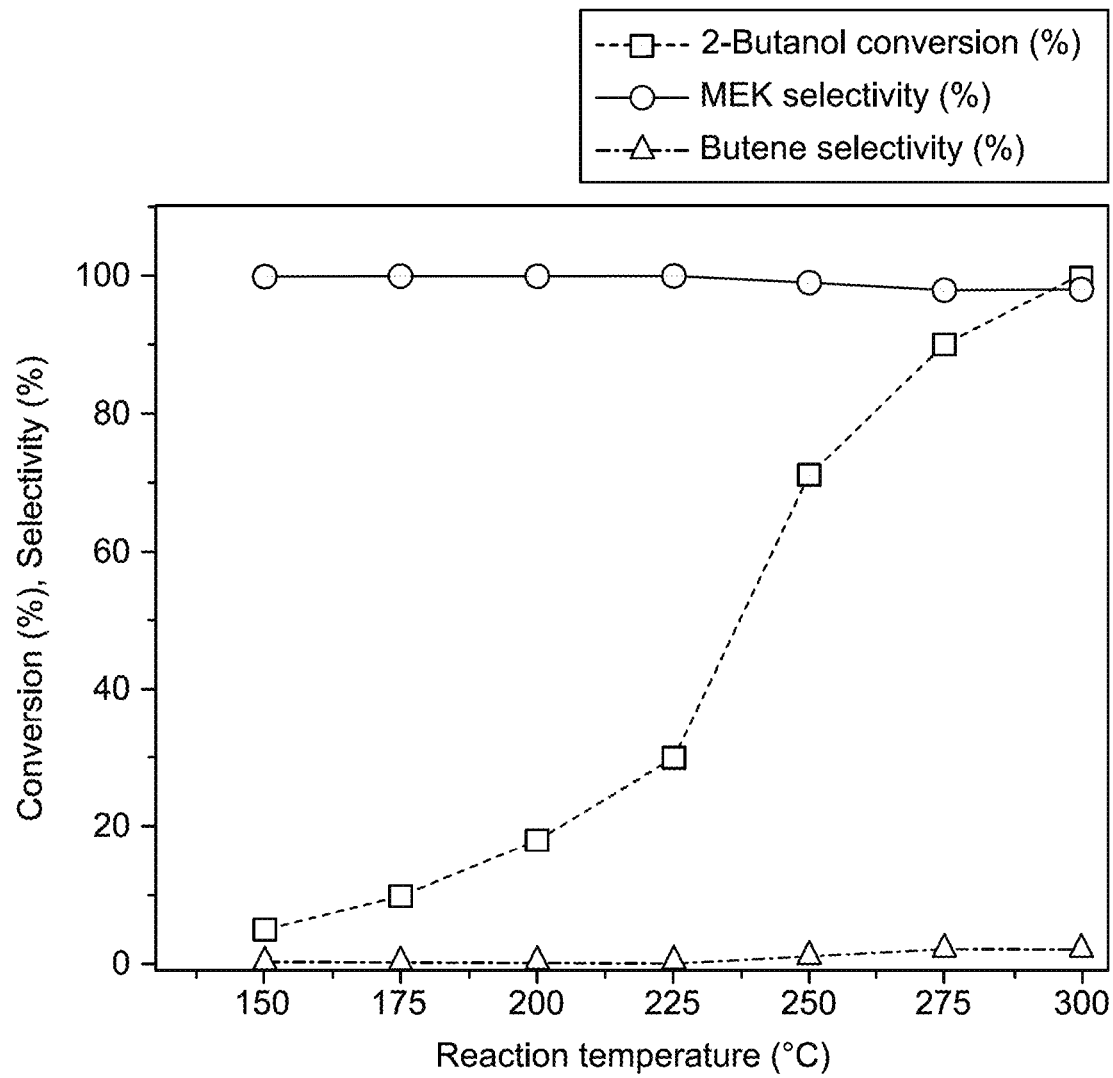
FIG. 4 shows the catalytic dehydrogenation of 2-butanol into methyl ethyl ketone (MEK) over $Co_3O_4$@C catalyst calcined at 400° C., according to certain embodiments.
Figure 5:
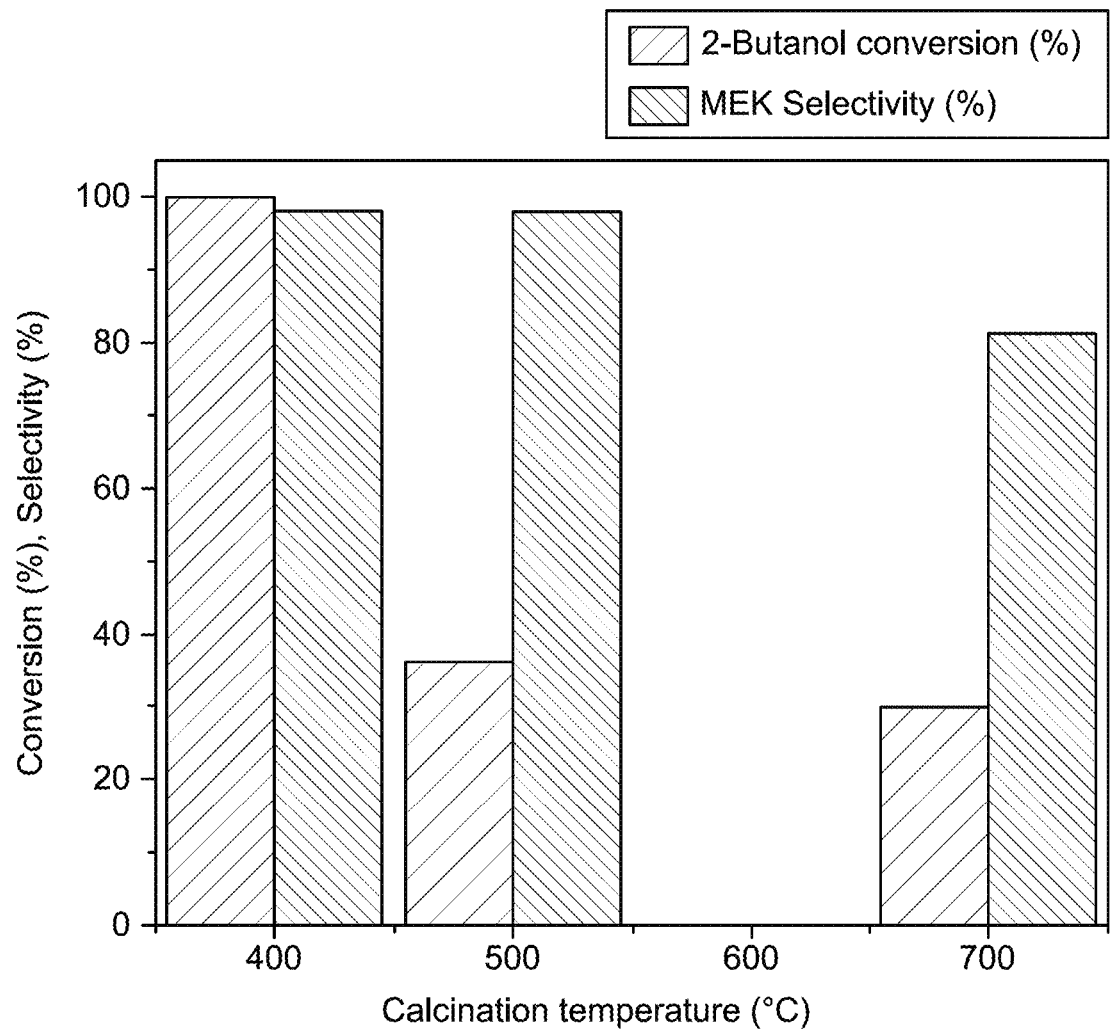
FIG. 5 shows the catalytic dehydrogenation of 2-butanol into MEK over $Co_3O_4$@C catalysts calcined at 400-700° C. at a reaction temperature of 300° C., according to certain embodiments.
Figure 6:
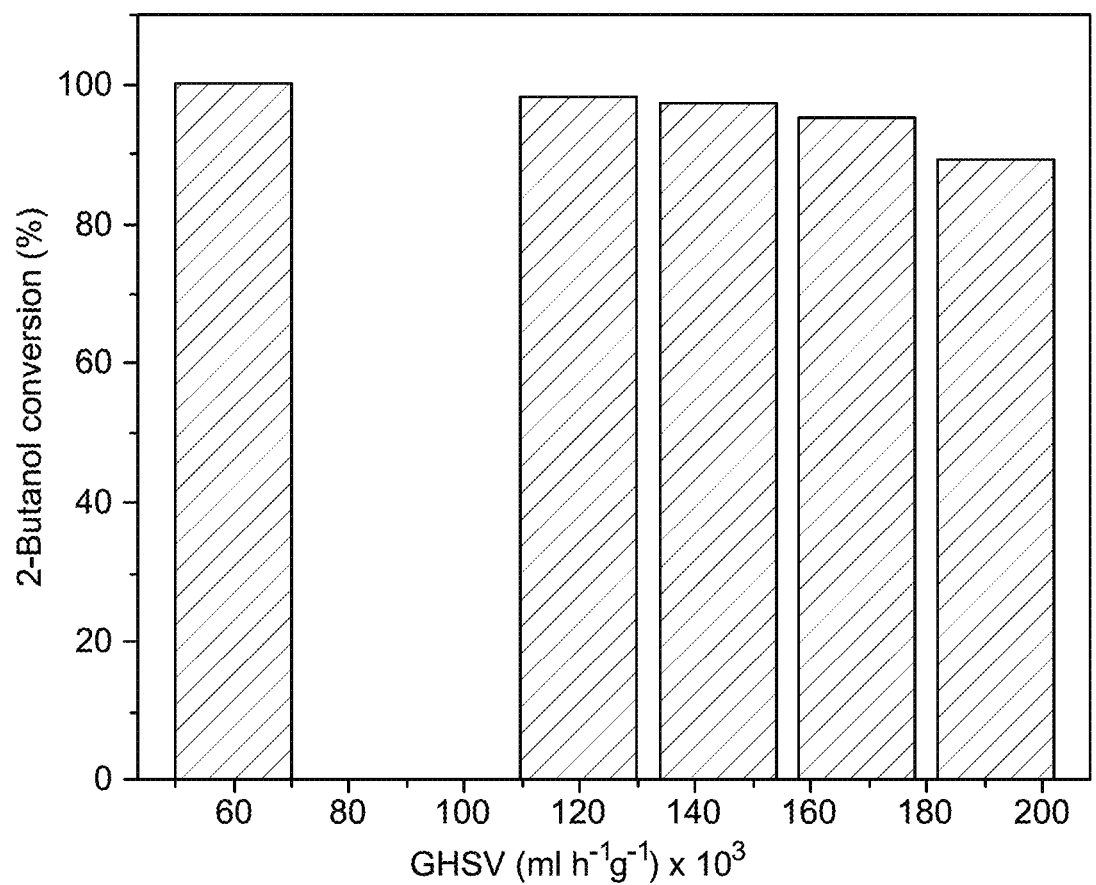
FIG. 6 shows the effect of gas hourly space velocity (GHSV) on the catalytic dehydrogenation of 2-butanol into MEK over $Co_3O_4$@C catalyst calcined at 400° C. at a reaction temperature of 300° C., according to certain embodiments.
Figure 7:
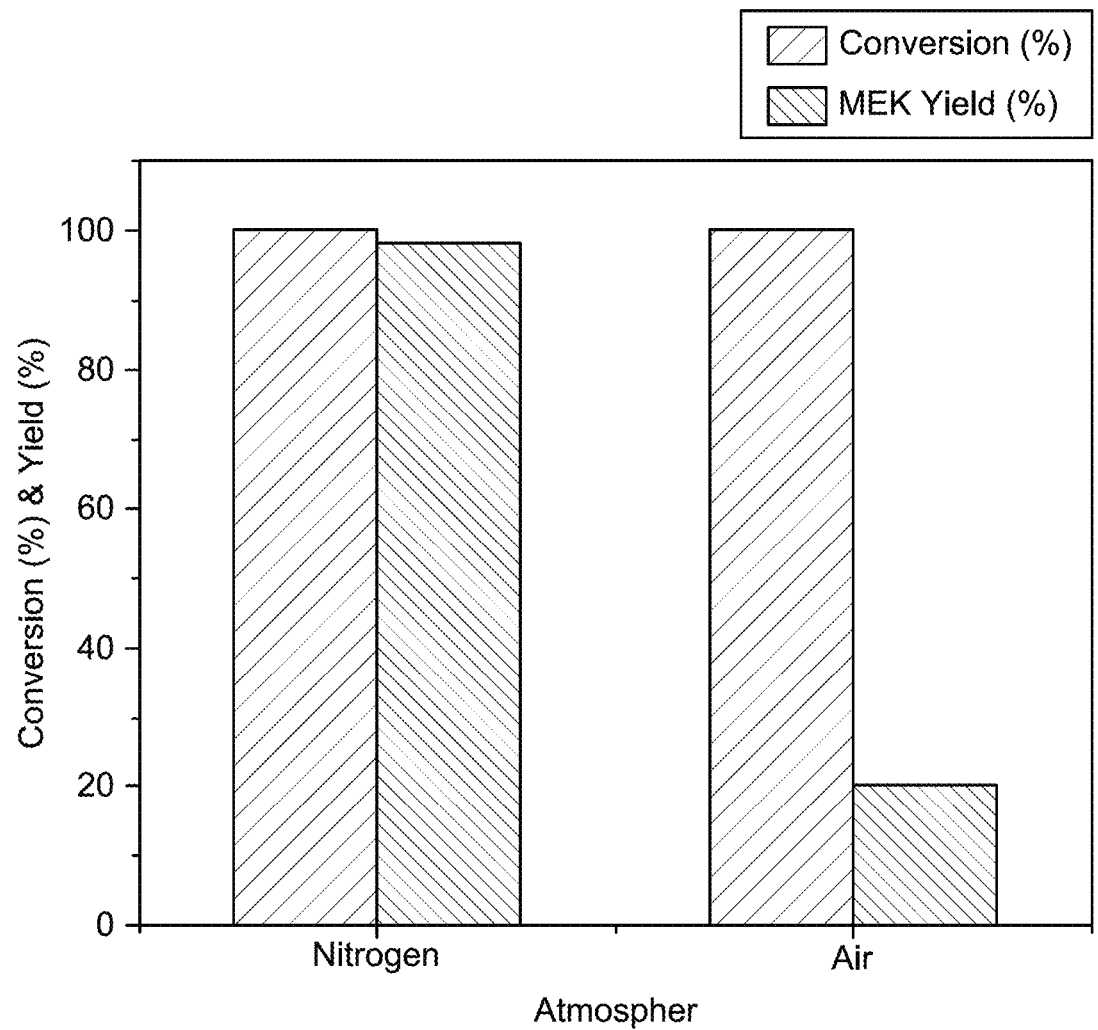
FIG. 7 shows the effect of atmosphere type on the catalytic dehydrogenation of 2-butanol into MEK over $Co_3O_4$@C catalyst calcined at 400° C. at a reaction temperature of 300° C., according to certain embodiments.
Figure 8:
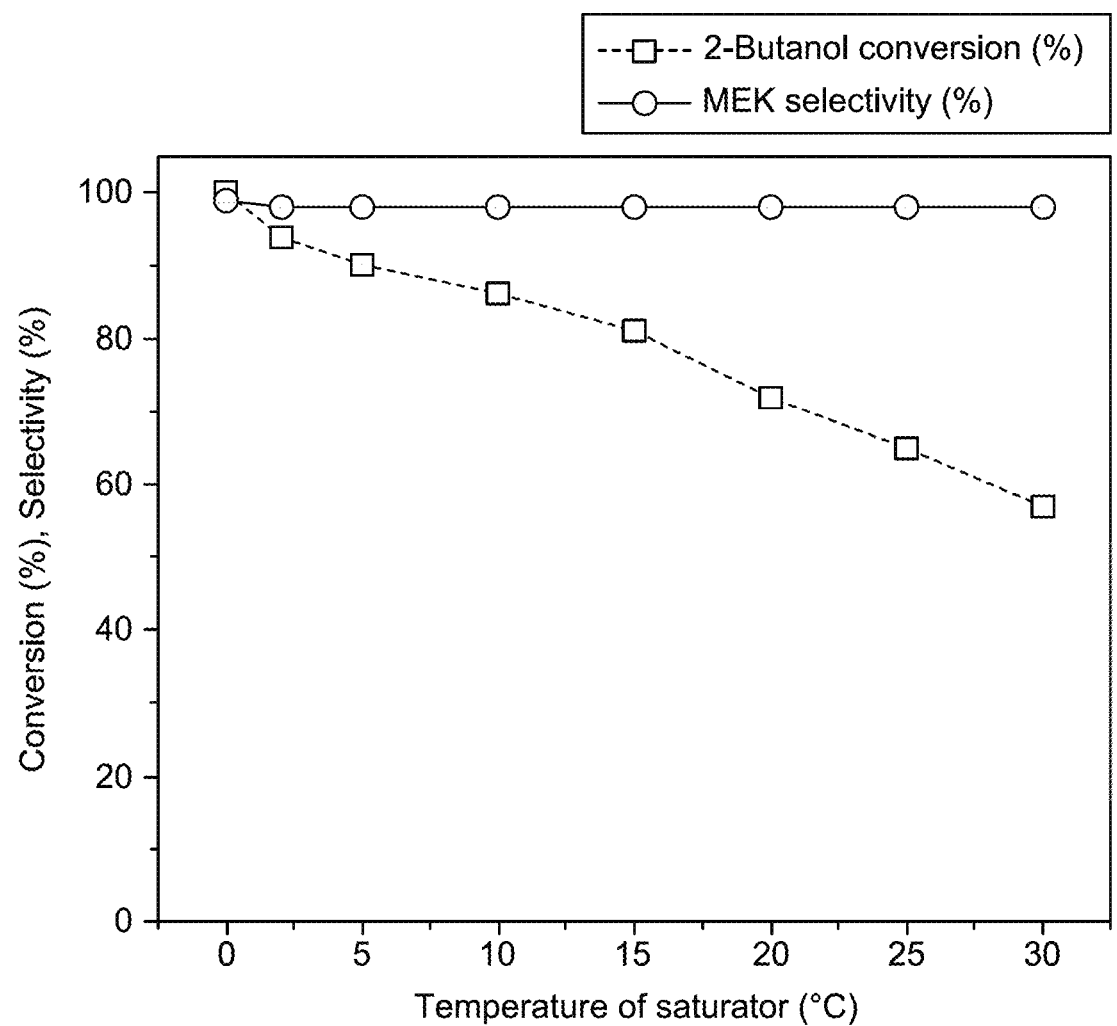
FIG. 8 shows the effect of % of 2-butanol in the reacting stream on its dehydrogenation into MEK over $Co_3O_4$@C catalyst calcined at 400° C. at a reaction temperature of 300° C., according to certain embodiments.

$CO_3O_4$@C was fabricated as a catalyst with high activity and selectivity to produce MEK. Catalytic activity results were carried out under the conditions of 0.05 g of catalyst, nitrogen gas bubbled within a saturator containing 2-butanol liquid thermostated at 0° C., and the vapor was introduced to the reactor at a flowrate of 100 ml/min. The reaction products were followed up, detected, and analyzed by gas-chromatography. The results of 2-butanol dehydrogenation in a temperature range of 150-300° C. over $CO_3O_4$@C catalyst calcined at 400° C. are shown in FIG. 4. Results reveals that, as the reaction temperature increases, the % conversion of 2-butanol increases to reach a complete conversion at 300° C. In the same manner, within the temperature range of 150-225° C., selectivity to MEK biofuel is 100%. While raising the temperature from 250° C. to 300° C., the MEK selectivity is slightly decreased to 98% at 300° C. Butene was found as the other detected product. The impact of calcination temperature on the catalytic performance of $CO_3O_4$@C was also investigated at a reaction temperature of 300° C.; the results are given in FIG. 5. It demonstrates that, on increasing the annealing temperature to 500° C., a drastic decrease was observed in the % conversion of 2-butanol (36%) while keeping the selectivity to MEK at 98%. Pushing the calcination temperature to 700° C., values of 2-butanol conversion of 30% and 81% selectivity to MEK were obtained. Butene was also the other detected product. The influence of GHSV on the catalytic performance of $Co_3O_4$@C towards 2-butanol dehydrogenation was also investigated at a reaction temperature of 300° C.; the results are given in FIG. 6. Results reveal that, as the value of GHSV increased from 60000 to 168000 ml $h^{-1}$ $g^{-1}$, a slight decrease was observed in the % conversion of 2-butanol where it decreases from 100 to 95% while keeping the selectivity to MEK at 98%. On further increase in the value of GHSV to reach 192000 ml $h^{-1}$ $g^{-1}$, 89% conversion was obtained, keeping selectivity to MEK at 98%. The influence of the type of atmosphere ($N_2$ or air) on the catalytic performance of $Co_3O_4$@C catalyst calcined at 400° C. towards 2-butanol dehydrogenation was also examined at a reaction temperature of 300° C. The results are given in FIG. 7. As previously mentioned, at 300° C., 100% conversion and 98% selectivity were obtained using the $N_2$ as an atmosphere. On using air as an atmosphere, the same value of conversion (100%) is obtained while the selectivity to MEK is drastically decreased to 20%. Such behavior may be attributed to the combustion of MEK by air at this reaction temperature. The impact of % of 2-butanol in the reacting stream on the catalytic performance of $Co_3O_4$@C catalyst calcined at 400° C. towards 2-butanol dehydrogenation was also examined at a reaction temperature of 300° C., and the results are given in FIG. 8. It infers that, as the reaction of the saturator increases, and thus the % of 2-butanol in the reacting stream increases, the % conversion of 2-butanol gradually decreases while keeping the selectivity to MEK at 98%. Such behavior is attributed to the increased number of 2-butanol molecules to be adsorbed and reacted on the catalyst surface. The high number of molecules compete with each other, thus decreasing the conversion of the reaction.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of methyl ethyl ketone (MEK) production from 2-butanol, comprising:
   contacting 2-butanol in a gas phase with a solid nanocomposite catalyst consisting of $Co_3O_4$ nanoparticles with an average particle size of 1 to 100 nm dispersed in a carbon matrix in a reactor at a temperature of about 300° C. to dehydrogenate the 2-butanol and form the MEK and hydrogen while gas sparging the reactor,
   wherein:
   the solid nanocomposite catalyst has a conversion of greater than or equal to 70 mol. % for 2-butanol to MEK and a selectivity of greater than or equal to 97.0% for 2-butanol to MEK, and
   the solid nanocomposite catalyst is formed from the calcination of ZIF-67 metal-organic framework at a temperature of 400° C. or less.

2. The method of claim 1, wherein the solid nanocomposite catalyst has a conversion of greater than or equal to 95 mol. % for 2-butanol to MEK and a selectivity of greater than or equal to 97.5% for 2-butanol to MEK at a reaction temperature of 300° C.

3. The method of claim 2, wherein the solid nanocomposite catalyst has a conversion of greater than or equal to 99 mol. % for 2-butanol to MEK and a selectivity of greater than or equal to 97.75% for 2-butanol to MEK at a reaction temperature of 300° C.

4. The method of claim 3, wherein the solid nanocomposite catalyst has a conversion of greater than or equal to 99.99 mol. % for 2-butanol to MEK and a selectivity of greater than or equal to 98% for 2-butanol to MEK at a reaction temperature of 300° C.

5. The method of claim 1, wherein the solid nanocomposite catalyst has a conversion of greater than or equal to 75 mol. % for 2-butanol to MEK and a selectivity of greater than or equal to 98% for 2-butanol to MEK at a reaction temperature of 250° C.

6. The method of claim 5, wherein the solid nanocomposite catalyst has a conversion of greater than or equal to 76 mol. % for 2-butanol to MEK and a selectivity of greater than or equal to 99% for 2-butanol to MEK at a reaction temperature of 250° C.

7. The method of claim 1, wherein the solid nanocomposite catalyst has a conversion of greater than or equal to 80 mol. % for 2-butanol to MEK and a selectivity of greater than or equal to 97.5% for 2-butanol to MEK at a reaction temperature of 275° C.

8. The method of claim 7, wherein the solid nanocomposite catalyst has a conversion of greater than or equal to 90 mol. % for 2-butanol to MEK and a selectivity of greater than or equal to 98% for 2-butanol to MEK at a reaction temperature of 275° C.

9. The method of claim 1, wherein the solid nanocomposite catalyst is in the form of $Co_3O_4$ nanoparticles with an average particle size in a range from 20 to 40 nm dispersed in a carbon matrix.

10. The method of claim 9, wherein the solid nanocomposite catalyst is in the form of $Co_3O_4$ nanoparticles with an average particle size in a range from 5 to 60 nm dispersed in a carbon matrix.

11. The method of claim 10, wherein the solid nanocomposite catalyst is in the form of $Co_3O_4$ nanoparticles with an average particle size in a range from 15 to 50 nm dispersed in a carbon matrix.

12. The method of claim 11, wherein the solid nanocomposite catalyst is in the form of $Co_3O_4$ nanoparticles with an average particle size in a range from 20 to 40 nm dispersed in a carbon matrix.

13. The method of claim 9, wherein the $Co_3O_4$ nanoparticles are coated with a carbon shell.

14. The method of claim 1, wherein the solid nanocomposite catalyst is formed from the calcination of ZIF-67 metal-organic framework at a temperature from 375 to 600° C.

15. The method of claim 14, wherein the solid nanocomposite catalyst is formed from the calcination of ZIF-67 metal-organic framework at a temperature from 390 to 500° C.

16. The method of claim 15, wherein the solid nanocomposite catalyst is formed from the calcination of ZIF-67 metal-organic framework at a temperature from 390 to 410° C.

17. The method of claim 1, wherein the gas hourly shape volume (GHSV) is in a range from 50 to 70 $ml·h^{-1}·g^{-1}$ and the solid nanocomposite catalyst has a conversion of greater than or equal to 99.99 mol. % for 2-butanol to MEK.

18. The method of claim 1, wherein the gas hourly shape volume (GHSV) is in a range from 110 to 150 $ml·h^{-1}·g^{-1}$ and the solid nanocomposite catalyst has a conversion of greater than or equal to 97.5 mol. % for 2-butanol to MEK.

19. The method of claim 1, wherein the gas hourly shape volume (GHSV) is in a range from 160 to 180 $ml·h^{-1}·g^{-1}$ and the solid nanocomposite catalyst has a conversion of greater than or equal to 95 mol. % for 2-butanol to MEK.

20. The method of claim 1, wherein the gas hourly shape volume (GHSV) is in a range from 180 to 200 $ml·h^{-1}·g^{-1}$ and the solid nanocomposite catalyst has a conversion of greater than or equal to 88 mol. % for 2-butanol to MEK.

* * * * *